United States Patent
Gandellini

[19]
[11] Patent Number: 5,887,952
[45] Date of Patent: *Mar. 30, 1999

[54] LIGHT ALLOY WHEEL ASSEMBLY FOR AN AUTOMOBILE

[75] Inventor: Gian Antonio Gandellini, Longhena, Italy

[*] Notice: This patent issued on a continued prosecution application filed under 37 CFR 1.53(d), and is subject to the twenty year patent term provisions of 35 U.S.C. 154(a)(2).

[73] Assignee: Toora S.r.l., Italy

[21] Appl. No.: 591,675

[22] PCT Filed: Aug. 5, 1994

[86] PCT No.: PCT/EP94/02596

§ 371 Date: Apr. 15, 1996

§ 102(e) Date: Apr. 15, 1996

[87] PCT Pub. No.: WO95/05291

PCT Pub. Date: Feb. 23, 1995

[30] Foreign Application Priority Data

Aug. 18, 1993 [EP] European Pat. Off. ............. 93830352
Apr. 7, 1994 [EP] European Pat. Off. ............. 94200949

[51] Int. Cl.$^6$ ........................................ B60B 3/14
[52] U.S. Cl. ................... 301/35.63; 301/35.58; 411/60
[58] Field of Search ............ 301/35.55, 35.58, 301/35.62, 35.63, 111, 114, 105.1; 411/45, 57, 60, 514, 515, 516, 517, 518, 519, 525, 352, 353

[56] References Cited

U.S. PATENT DOCUMENTS

| | | | |
|---|---|---|---|
| 2,010,553 | 8/1935 | McIntosh | 411/60 |
| 2,252,316 | 8/1941 | Gelpcke | 411/60 |
| 2,321,170 | 6/1943 | Wallace | 411/60 |
| 2,616,328 | 11/1952 | Kingsmore | 411/60 |
| 2,746,804 | 5/1956 | Bourdon | 301/35.63 |
| 2,926,409 | 3/1960 | Perry | 411/517 X |
| 3,606,814 | 9/1971 | MacKenzie | 411/60 |
| 4,537,449 | 8/1985 | Hayashi | 301/35.63 |
| 5,090,778 | 2/1992 | Laudszun et al. | 301/105.1 |
| 5,211,448 | 5/1993 | Hayashi | 301/35.63 X |
| 5,636,905 | 6/1997 | Pagacz | 301/35.63 |

FOREIGN PATENT DOCUMENTS

| | | | |
|---|---|---|---|
| 1121096 | 7/1956 | France | 301/35.63 |
| 1549438 | 11/1968 | France . | |
| 643488 | 4/1937 | Germany | 301/35.63 |
| 577095 | 5/1946 | United Kingdom . | |
| 2080745 | 2/1982 | United Kingdom . | |

Primary Examiner—Russell D. Stormer
Attorney, Agent, or Firm—Rothwell, Figg, Ernst & Kurz, p.c.

[57] ABSTRACT

The light alloy wheel assembly for motor vehicles includes a rim for mounting a tire, a wheel hub for fixing the wheel assembly to a motor vehicle axle hub, a disc or spokes connecting the wheel hub and the rim, a false hub to be fixed on the vehicle axle hub and to allow fixing thereon of the wheel hub, and bolt/bore/seat arrangements for tightening and centering the false hub on the vehicle axle hub. A number of centering pins are provided on the false hub, with a corresponding number of bores on the wheel hub. A central threaded pin is formed on the false hub, a corresponding central bore is formed in the wheel hub, a nut is provided for screwing on the threaded pin, and a striker seat for the nut is formed on the flange around the central bore. Such a wheel assembly permits mounting of a single-nut wheel on the axle hub of a motor vehicle.

6 Claims, 3 Drawing Sheets

LIGHT ALLOY WHEEL ASSEMBLY FOR AN AUTOMOBILE

FIELD OF THE INVENTION

The present invention relates to a light-alloy automobile-wheel assembly.

BACKGROUND ART

It is known that light alloy wheels are not always the first equipment of an automobile. Indeed, very often alloy wheels are mounted in replacement of the standard steel wheels. There is also a rather broad market, especially for high-performance cars, in which the original light alloy wheels are replaced with others of a more refined design.

The maker of alloy wheels must therefore provide his products to meet the dimensional requirements imposed by the various automobiles.

In addition to the two basic dimensions consisting of the diameter and width of the wheel, a measurement which must be taken into consideration with the greatest attention is the distance between the striker surface of the wheel on the hub and the median plane of the wheel. Even for the same diameter and width, wheels of different cars often differ in said distance.

To meet the various requirements, the wheel maker is thus forced to provide and keep in store a very broad range of wheels. This is particularly costly for large-diameter wheels designed for high-performance sports cars. In this case, the design refinement of the cars makes it necessary for practically each car type to have its specific wheel. In addition, each wheel has a rather high value. Finally, the quantities of such cars in existence and hence the market for their wheels are of course very limited.

There is thus the problem of providing a wheel assembly which can be used on several automobiles.

There are known (FR-A-1549438, GB-A-2080745) adapters which permit mounting the spare wheel of a motor vehicle on the hub of a trailer having couplings different from those of the automobile. These adapters comprises an intermediate disc with bores designed for fixing on the studs of the trailer hub and with studs designed for fixing of the motor vehicle wheel.

There is also known (GB-A-577095) a wheel for agricultural tractors provided in two parts, i.e. an external part made in various sizes and forms to be able to carry various tires or special rims, and an internal portion which can also be made in various sizes and forms suited for mounting on different hubs. The two parts are coupled together by means which ensure their interchangeability.

In addition, among light alloy wheels, wheels whose design resembles the single-nut wheels used in competition, i.e. wheels having a single central fixing nut in place of the normal four or five nuts, are much more appreciated due to their sporty appearance. Naturally these are not truly single-nut wheels. Indeed, their central 'nut' is merely a shaped cap covering the normal fixing nuts.

BRIEF DESCRIPTION OF THE INVENTION

The problem underlying the present invention is thus to provide a wheel assembly comprising a single-nut fixing system which could be readily used on any motor vehicle. Consequently, the present invention relates to a light-alloy automobile-wheel assembly comprising a rim including:

a channel designed to house a tire, a central flange for fastening the rim to a motor vehicle hub, a connection structure with disc or spokes between the flange and the channel, a false hub designed to be fixed on the hub and allow fixing thereon of the flange, first means of tightening and centering the false hub on the hub, second means of tightening and centering of the flange on the false hub, characterized in that the second tightening and centering means comprise:

a plurality of centering pins on the false hub, a tapered external surface on each of the centering pins, a corresponding plurality of bores in the flange, a bush between each of the pins its respective bore, said bush having a tapered internal surface with taper corresponding to that of the external surface of the centering pins, a central threaded pin formed on the false hub, a corresponding central bore formed in the flange, a nut designed to be screwed on the threaded pin, and a striker seat for the nut formed on the flange around the central bore.

Such a wheel assembly permits mounting of a truly single-nut wheel on the hub of any motor vehicle.

With such a wheel assembly the differences existing elastic materials, preferably stainless spring steel. This material has proven perfectly suited both as to its mechanical characteristics and its aging resistance.

Advantageously the rim comprises an annular groove in the wall of the central bore to give an elastic yielding to the rim under the tightening effect of the nut. This helps greatly to prevent loosening of the nut.

BRIEF DESCRIPTION OF DRAWINGS

A detailed description of an embodiment of the present invention is given below with reference to the annexed drawings wherein.

DETAILED DESCRIPTION OF A PREFERRED EMBODIMENT

Figure 1:
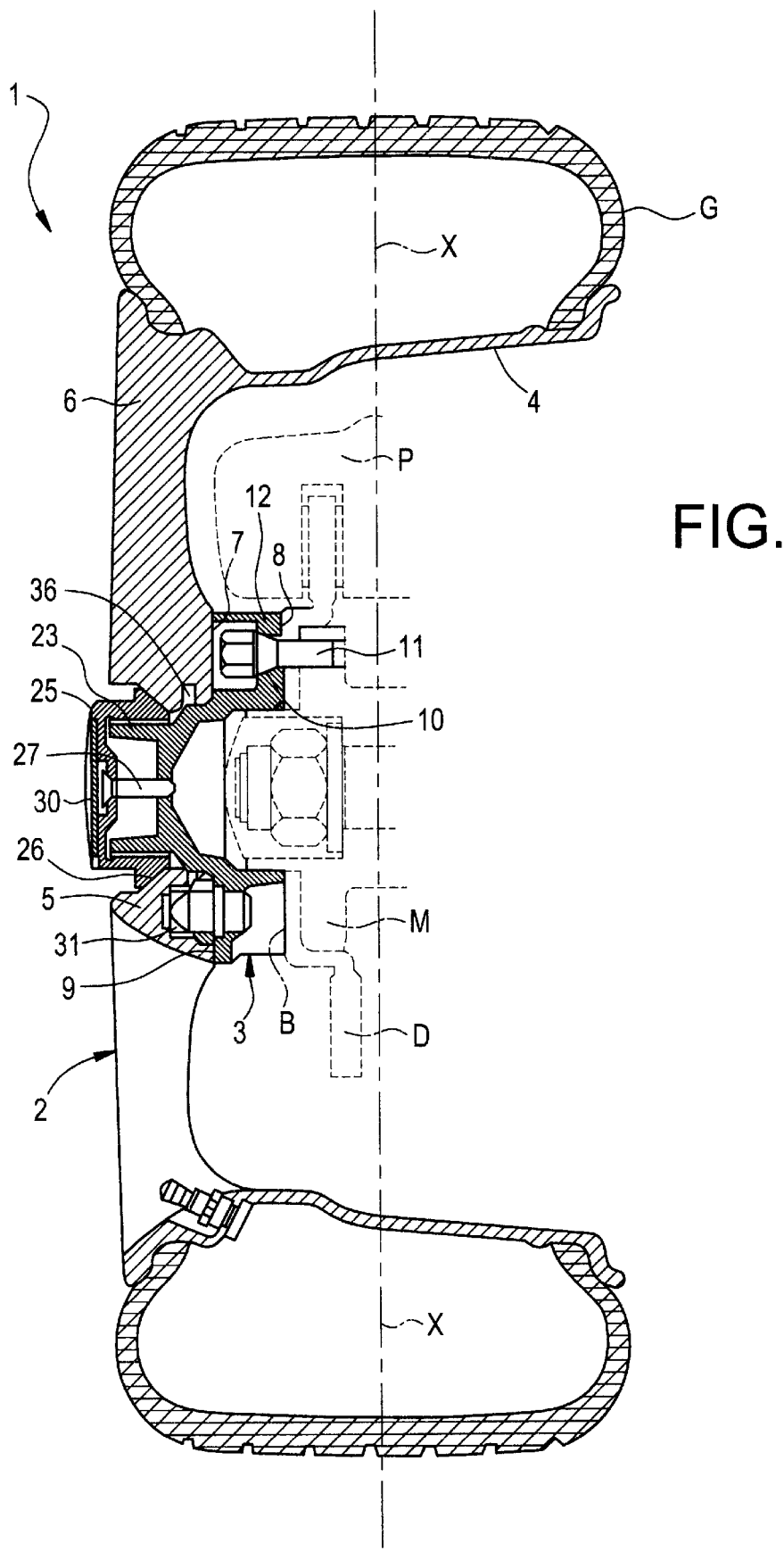
FIG. 1 shows a cross section view of a wheel assembly in accordance with the present invention.

In the figures, 1 indicates a light alloy wheel assembly in accordance with the present invention designed to be mounted on a hub vehicle axle M of an automobile.

Typically, the hub M is integral with a braking unit such as a disc D and a caliper P which are illustrated in the figures to better show the encumbrances around the hub M. The hub M has a striker surface B which can be made optionally on the brake disk D which in this case is intended to be an integral part of the hub M.

A wheel mounted correctly on the hub M must have the median plane x very accurately positioned in relation to the striker surface B. In other words, the distance between the striker surface B and the plane X is a specific characteristic of each automobile (or better each hub, since it can be different between hubs of the same automobile) which is defined here as the characteristic distance of the hub DCM. The value of DCM is positive when (as in the figures) the plane X is further inward of the automobile than the surface B while it is negative in the contrary case.

The wheel assembly 1 comprises a rim 2 (corresponding to a wheel disk, spokes or spider portion) and a false hub 3.

The rim 2 is provided in light alloy by casting (in earth, in a mold, by injection or pressure die-casting) of a suitable alloy, normally aluminum based. It comprises a channel 4 (corresponding to a rim for mounting a tire), a central flange 5 (corresponding to a wheel hub for fixing the wheel assembly to a vehicle axle hub of the motor vehicle) and a connection structure 6 (corresponding to the wheel disks or spokes connecting the wheel hub and the rim) between the channel and the flange. These three parts can be made in one piece in the same casting or can be manufactured separately and then assembled with screw-bolts or equivalent.

The channel 4 is designed to house a tire G and is the element which defines the width and diameter of the wheel. The connection structure 6 is normally with spokes (as in the case illustrated) but can also be with disc with optional lightening and ventilation bores or openings.

The central flange 5 is provided with a striker surface 7. The distance between the striker surface 7 and the median plane of the wheel X is defined here as the characteristic distance of the wheel DCR. The value of DCR is positive when (as in the figures) the plane X is further inward of the automobile than the surface 7 while it is negative in the opposite came.

The false hub 3 is provided of forged steel. It comprises a first striker surface 8 designed for resting against the striker surface B of the hub M and a second striker surface 9 designed for resting against the striker surface 7 of the flange. All the striker surfaces B, 7, 8 and 9 have a basically annular form optionally broken in sections for the necessity of housing tightening and centering elements which are illustrated below.

The distance between the striker surfaces 8 and 9 of the false hub 3 is a characteristic magnitude of the false hub 3 and is defined here as the interface thickness SI.

For correct positioning of the wheel assembly 1 on the automobile the following relationship must be true:

$$DCM = DCR - SI$$

As seen, the variation of the value of DCM between different automobiles can be compensated for entirely by SI, holding DCR constant, provided DCR is great enough, since SI cannot be negative but must be greater than a minimum value imposed by structural requirements. To achieve this, DCR must be greater than a predetermined value and selected so as to be sufficiently greater than the maximum value of DCM among the installations expected for a certain wheel assembly. The value of DCM will obviously be different depending on the diameter and width of the rim 2 which identify the family of automobiles on which the wheel assembly 1 can be mounted.

The value of SI must be greater than a minimum value, typically 30 mm, to ensure mechanical strength of the false hub.

The above conditions being observed, the wheel assembly 1 designed for a specific automobile is made up of a rim 2 (the same for all automobiles having equal width and diameter of the channel 4) and a false hub 3 specific for each automobile.

The wheel assembly 1 then includes first means of tightening and centering to anchor the false hub 3 to the hub M and second means of tightening and centering to anchor the flange 5 of the rim 2 on the false hub 3.

The first tightening means comprise a plurality (typically from 3 to 5) of through bores 10 formed in the false hub 3 and a corresponding plurality of hexagonal head screw-bolts 11 designed to be inserted in the through bores 10 and then screwed into the threaded bores F formed in the hub M. The screw-bolts 11 rest on respective seats 12 formed in the false hub 3 around the bores 10. The seats 12 have a tapered form like the lower parts of the screw-bolts 11 so as to effectively ensure tightening and centering.

The second tightening means comprise a plurality of centering pins 21 fixed on the second striker surface 9 of the false hub 3, a corresponding plurality of bores 22 in the striker surface 7 of the flange 5, a threaded central pin 23 formed on the false hub 3, a corresponding through central bore 24 formed in the flange 5, a nut 25 designed to be screwed on the threaded pin 23, and a striking seat 26 for the nut 25 formed on the flange 5 around the central bore 24.

The seat 26 can be flat or (as illustrated in the figures) tapered in form like the lower part of the nut 25 so as to ensure effectively both tightening and centering. To avert in all cases loosening of the nut 2!5 there is provided a central screw-bolt 27 inserted in it seat 28 in the nut 2S and screwed into a respective bore 29 in the false hub 3. A disc 30 in fixed on the nut 25 to cover the screw-bolt 27 and the seat 28.

The pins 21 are preferably two in number and arranged asymmetrically so as to ensure correct positioning in the mounting of the rim 2.

The second tightening mans comprise also between each pin 21 and each bore 22 bushes 31 provided of stainless spring steel. The centering pins 21 comprise a tapered external surface 32 while the bushes 31 comprise a tapered internal surface 33. The two tapered surfaces 32 and 33 have the same taper.

Figure 2:
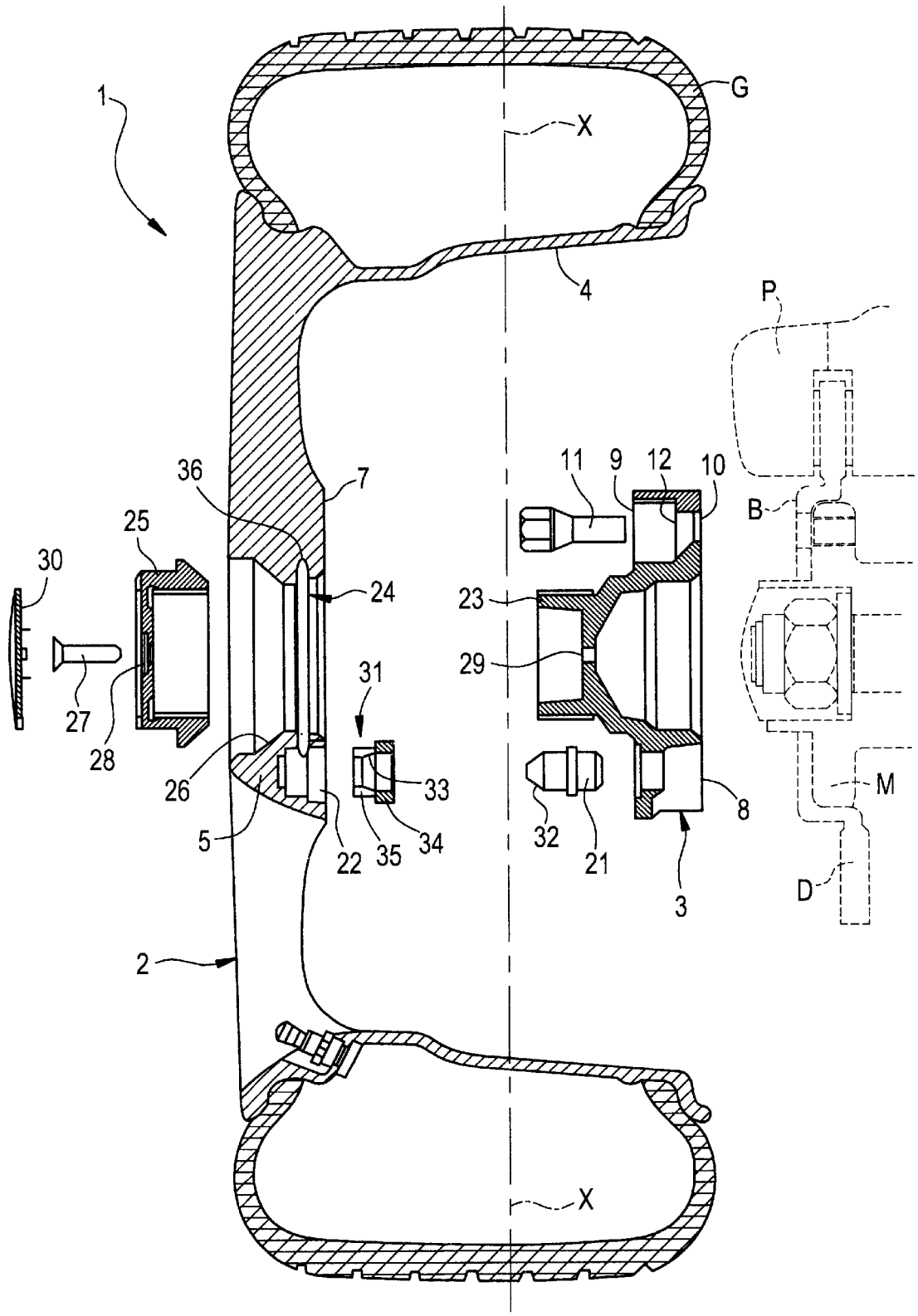
FIG. 2 shows an exploded cross section view of the wheel assembly of FIG. 1.
Figure 3:
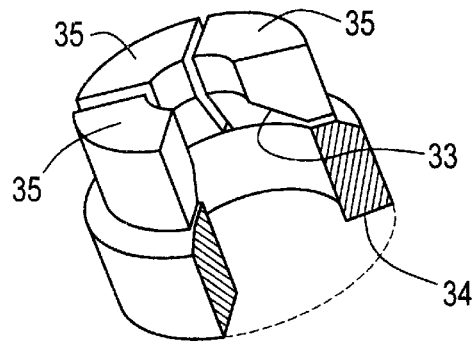
FIG. 3 is a perspective view of a bush of the wheel assembly of FIG. 1, partly sectioned.

According to the embodiment of FIGS. 1 to 3, each bush 31 comprises a ring portion 34 and some (at least two, better four as shown) segments 35 which are integral with the ring portion 34 and spaced from one another. The tapered internal surface 33 is formed on said segments 35. Each segment 35 is bendable elastically in relation to the ring portion 34.

Each bush 31 is mounted in the respective bore 22 with the segments 35 turned inward and the ring portion 34 turned outward. Externally, both the ring portion 34 and the totality of the segments 35 have a substantially cylindrical form and are housed in respective cylindrical zones of the bores 22.

Figure 4:
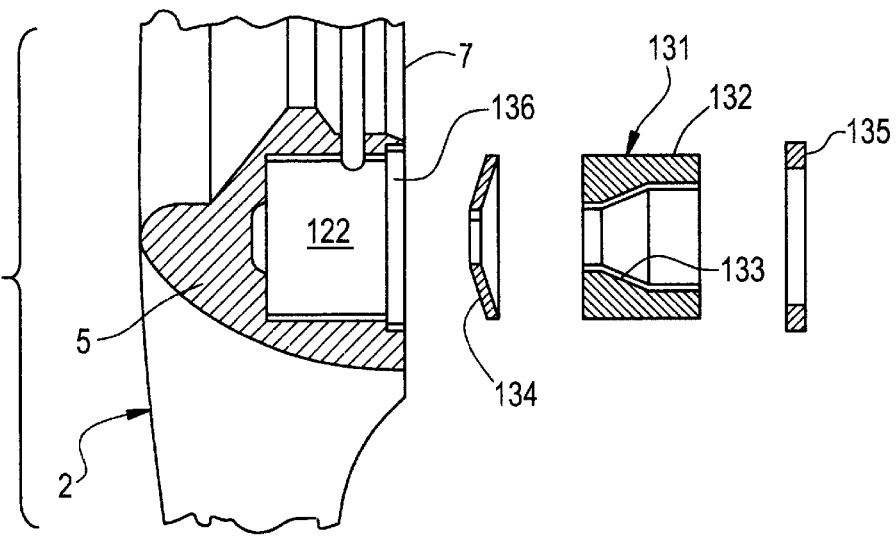
FIG. 4 is an exploded cross section of a detail of the wheel assembly of FIG. 1, showing a different embodiment for the bush.
Figure 5:
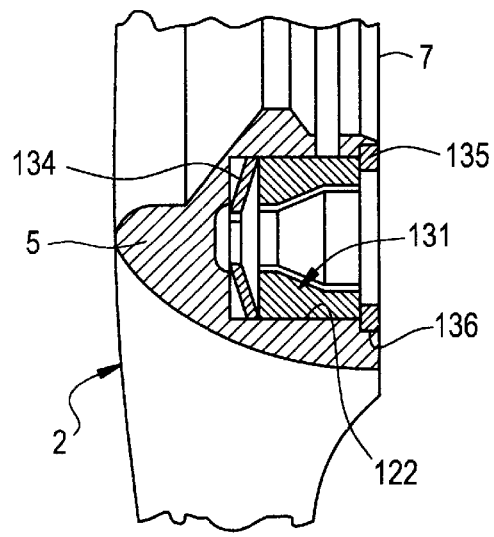
FIG. 5 is a cross section corresponding to FIG. 4, with the elements in assembled condition.

According to the preferred embodiment shown in FIGS. 4 and 5, each bush—numbered 131, to distinguish over the other bush 31 described above—has a rigid tubular body with an external cylindrical surface 132 and an internal tapered surface 133. Each bush 131 is slidingly mounted in a cylindrical bore 122 of the flange 5, such bore 122 having a diameter just a little wider than the external diameter of the bush 131, to allow sliding engagement. A cup spring 134 is placed at the bottom of the bore 122 and elastically urges the bush 131 outwardly; a locking ring 135 is forcedly mounted in a seat 136 on the mouth of the bore 122 to keep the bush 131 within the bore 122.

The rim 2 comprises also an annular groove 36 formed in the flange 5 inside the bore 24 and substantially behind the striker seat 26 of the nut 25.

During use, the torque (motive and/or braking) is transmitted between the hub M and the false hub 3 by friction between the striker surfaces B and 8 thanks to the tightening effect of the nuts 11. Substantially no torque, is transmitted directly from the nuts by entrainment.

Between the false hub 3 and the rim 2 on the other hand a significant part of the torque is transmitted from the pins 21 by entrainment. The tapered coupling between the surfaces 32 and 33 (or 133) permits obtaining simultaneously that there be no play during transmission of the torque and no forcing during removal of the rim. The first characteristic avoids setting up of minor relative slipping between the rim 2 and the false hub 3 which would cause wear of the rim 2, which is made of soft material. The second characteristic avoids that the rim 2 remain jammed on the false hub 3 and practically impossible to remove except in a shop with the use of special equipment.

Removal of the wheel, i.e. disengagement of the flange 5 from the false hub 3, is helped by the elastic action on the bush 31 or 131, After the wheel is installed and with the nut 25 tightened on its seat 26 the groove 36 facilitates elastic crushing deformation of the flange 5 of the rim 2. The elastic thrust reaction consequent upon this deformation is a substantial obstacle to loosening of the nut 25. This makes substantially superfluous the presence of the screw 27 which however can be kept.

I claim:

1. A light alloy wheel assembly for a motor vehicle comprising:
    a rim for mounting a tire,
    a wheel hub for fixing the wheel assembly to a vehicle axle hub of the motor vehicle,
    a disc or spokes connecting the wheel hub and the rim,
    a false hub to be fixed on the vehicle axle hub and to allow fixing thereon of the wheel hub,
    first means for tightening and centering the false hub on the vehicle axle hub, and
    second means for tightening and centering of the wheel hub on the false hub,
wherein the second tightening and centering means further comprises:
    a plurality of centering pins positioned on the false hub,
    a corresponding plurality of bores on the flange wheel hub,
    a central threaded pin formed on the false hub,
    a corresponding central bore formed in the wheel hub,
    a nut for screwing on the central threaded pin,
    a striker seat for the nut formed on the wheel hub around the central bore,
    a tapered external surface on the centering pins,
    an elastic bush assembly between the pins and the respective bores formed in the flange, said elastic bush assembly including a bush having a tapered internal surface with a taper corresponding to that of the external surface of the centering pins.

2. A light alloy wheel assembly for a motor vehicle comprising:
    a rim for mounting a tire,
    a wheel hub for fixing the wheel assembly to a vehicle axle hub of the motor vehicle,
    a disc or spokes connecting the wheel hub and the rim,
    a false hub to be fixed on the vehicle axle hub and to allow fixing thereon of the wheel hub,
    first means for tightening and centering the false hub on the vehicle axle hub, and
    second means for tightening and centering of the wheel hub on the false hub,
wherein the second tightening and centering means further comprises:
    a plurality of centering pins positioned on the false hub,
    a corresponding plurality of bores on the flange wheel hub,
    a central threaded pin formed on the false hub,
    a corresponding central bore formed in the wheel hub,
    a nut for screwing on the central threaded pin,
    a striker seat for the nut formed on the wheel hub around the central bore,
    a tapered external surface on the centering pins,
    a bush between the pins and the respective bores formed in the flange, said bush having a tapered internal surface with a taper corresponding to that of the external surface of the centering pins, in which the bush comprises a ring portion and at least two segments integral with the ring portion and separated from each other, and in said segments there being formed the tapered internal surface, and said segments being elastically bendable in relation to the ring portion.

3. A wheel assembly in accordance with claim 2 in which the bush is provided of stainless steel.

4. A light alloy wheel assembly for a motor vehicle comprising:
    a rim for mounting a tire,
    a wheel hub for fixing the wheel assembly to a vehicle axle hub of the motor vehicle,
    a disc or spokes connecting the wheel hub and the rim,
    a false hub to be fixed on the vehicle axle hub and to allow fixing thereon of the wheel hub,
    first means for tightening and centering the false hub on the vehicle axle hub, and
    second means for tightening and centering of the wheel hub on the false hub,
wherein the second tightening and centering means further comprises:
    a plurality of centering pins positioned on the false hub,
    a corresponding plurality of bores on the flange wheel hub,
    a central threaded pin formed on the false hub,
    a corresponding central bore formed in the wheel hub,
    a nut for screwing on the central threaded pin,
    a striker seat for the nut formed on the wheel hub around the central bore,
    a tapered external surface on the centering pins,
    a bush between the pins and the respective bores formed in the flange, said bush having a tapered internal surface with a taper corresponding to that of the external surface of the centering pins, in which the bush is slidingly engaged in the bore on the wheel hub, a spring being provided on the bottom of the bore to urge the bush outwardly, and a locking ring being provided on a mouth of the bore to keep the bush within the bore.

5. A wheel assembly in accordance with claim 4 in which the spring is a cup spring.

6. A light alloy wheel assembly for a motor vehicle comprising:
    a rim for mounting a tire,
    a wheel hub for fixing the wheel assembly to a vehicle axle hub of the motor vehicle,
    a disc or spokes connecting the wheel hub and the rim, a false hub to be fixed on the vehicle axle hub and to allow fixing thereon of the wheel hub, first means for tightening and centering the false hub on the vehicle axle hub, and second means for tightening and centering of the wheel hub on the false hub, wherein the second tightening and centering means further comprises:

a plurality of centering pins positioned on the false hub, a corresponding plurality of bores on the flange wheel hub, a central threaded pin formed on the false hub, a corresponding central bore formed in the wheel hub, a nut for screwing on the central threaded pin, a striker seat for the nut formed on the wheel hub around the central bore, further comprising an annular groove made in a wall of the central bore to give an elastic yielding to the disk or spokes under the tightening effect of the nut.

* * * * *